No. 665,009. Patented Jan. 1, 1901.
T. HICKLING.
CAR COUPLING.
(Application filed Aug. 22, 1900.)

(No Model.) 2 Sheets—Sheet 1.

Inventor
Thomas Hickling,

Witnesses
B. F. Funk

By Victor J. Evans Attorney

No. 665,009. Patented Jan. 1, 1901.
T. HICKLING.
CAR COUPLING.
(Application filed Aug. 22, 1900.)
(No Model.) 2 Sheets—Sheet 2.
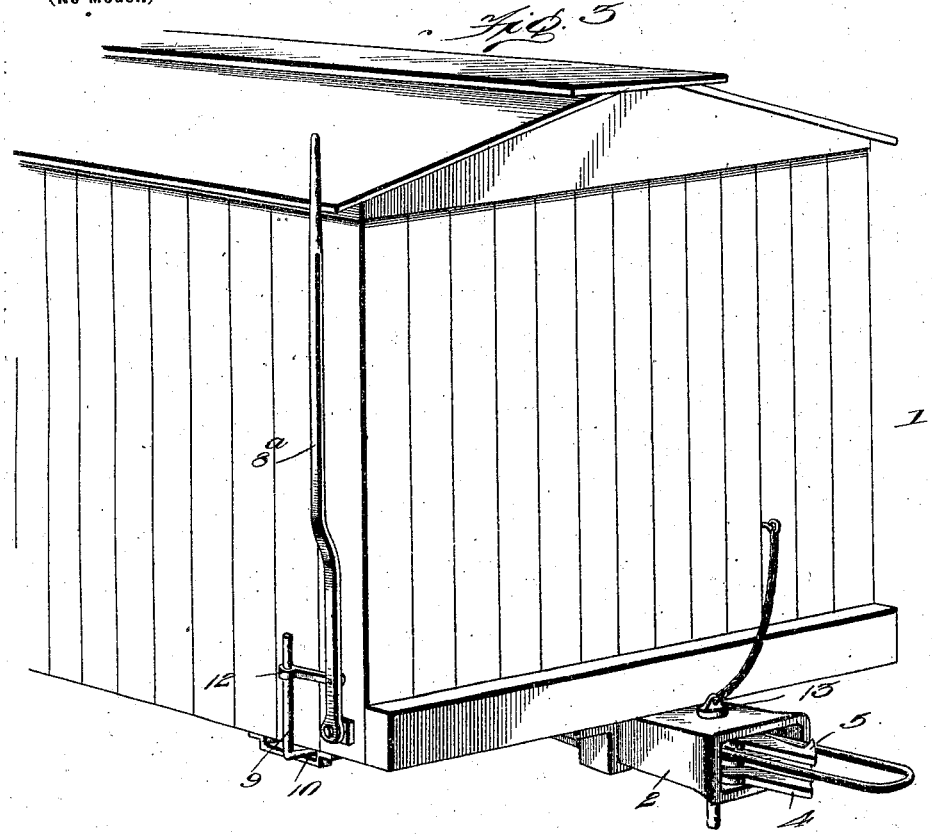
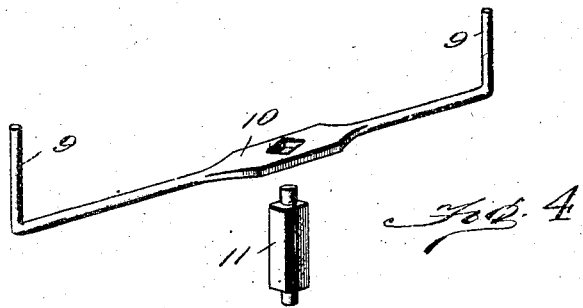
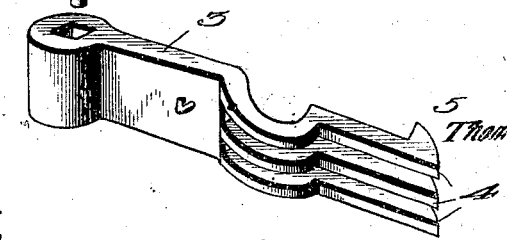
Witnesses
Inventor
Thomas Hickling,
By Victor J. Evans Attorney

UNITED STATES PATENT OFFICE.

THOMAS HICKLING, OF FRIENDLY, MARYLAND, ASSIGNOR OF ONE-FIFTH TO GEORGE MEIERE, OF FORT WASHINGTON, MARYLAND.

CAR-COUPLING

SPECIFICATION forming part of Letters Patent No. 665,009, dated January 1, 1901.

Application filed August 22, 1900. Serial No. 27,726. (No model.)

*To all whom it may concern:*

Be it known that I, THOMAS HICKLING, a citizen of the United States, residing at Friendly, in the county of Prince George and State of Maryland, have invented new and useful Improvements in Car-Couplers, of which the following is a specification.

This invention relates to the general class of car-couplers, but more particularly to that class in which a pivoted jaw is positioned in each draw-head, and has for its object to provide a cheap, durable, and efficient means of accomplishing the desired result, as well as guard against accidents to the operator in manipulating the device.

The peculiar points of novelty will be fully described hereinafter, pointed out in the claim, and illustrated in the accompanying drawings, in which—

Figure 1:
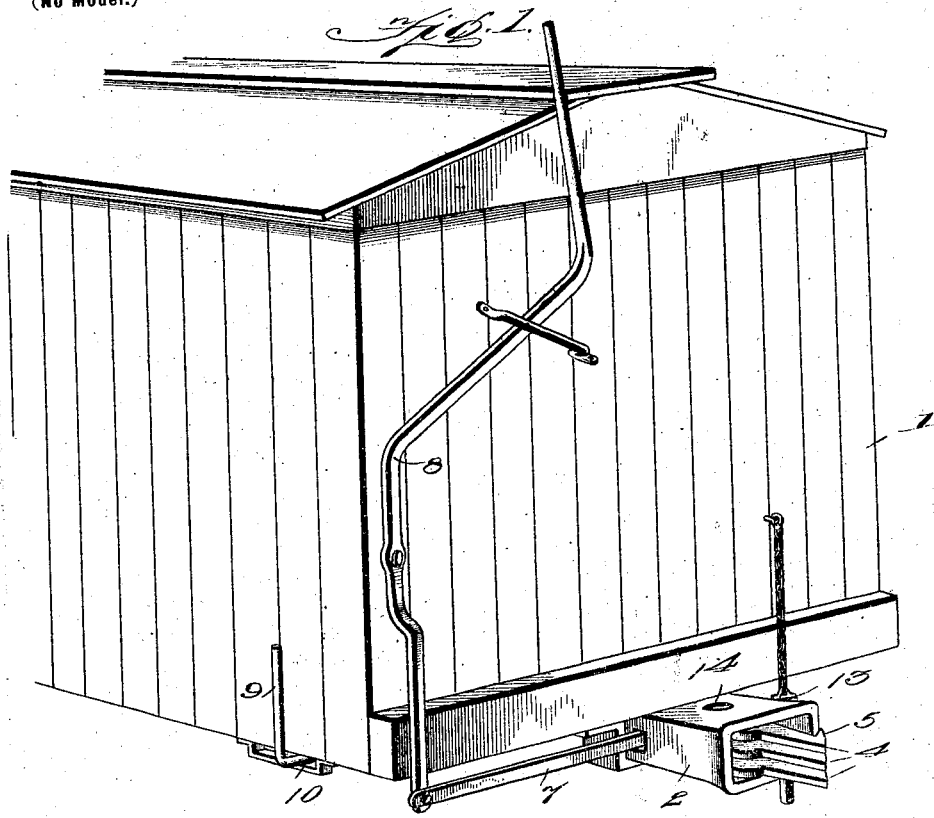
Figure 2:
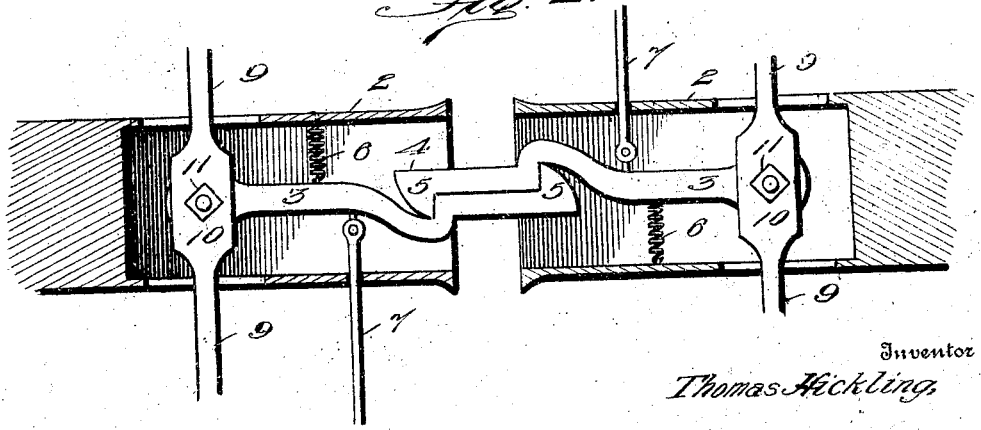

Figure 1 is a portion of a car of standard construction to which my invention is applied. Fig. 2 is a longitudinal cross-section through the draw-heads, showing the relative position of the jaws when coupled. Fig. 3 is a perspective view of an end of a car to which my invention is applied, but showing a slightly-modified form of uncoupling-lever; and Fig. 4 is fragmentary view of the interior mechanism of the coupling.

Referring now to the drawings by reference-numerals, 1 designates a portion of a car to which is secured at either end a substantially rectangular draw-head 2. Pivotally secured within the draw-head at a suitable point rearwardly thereof is a jaw 3. This jaw comprises a bar of suitable metal, on the forward end of which are a plurality of parallel fingers 4, one above the other. Each finger is spaced apart with relation to the remaining ones and comprises a headed bar 5, connected to the bar 3 by a curved offset to be engaged by the head on the forward end of the opposing jaws, as illustrated in Fig. 2. In order to hold the jaws in a locked position, torsional spring 6 is attached to the inner wall of the draw-head and to the jaw intermediate its end and forward of its pivotal point. To the opposite side of the jaw and extending through the draw-head is a pull-iron 7, which is connected by a bell-crank lever 8, the handle of which extends to the upper portion of the car, whereby the tension of the spring may be overcome by operating said lever to uncouple the car. However, should it be found desirable to uncouple from the ground this can be accomplished by turning or forcing back upon the extended arm 9 of the lever 10, rigidly secured to the angular pivot-pin 11, to which the jaw 3 is also rigidly secured.

In the modified form shown in Fig. 3 the operating-lever 8ª comprises a straight bar and is connected to the lever 10 by a link connection 12. This construction will be very desirable for flat-cars, as well as box or other cars, and I reserve the right to utilize it for any purpose to which it may be employed.

13 designates a pin carried by the car by a suitable flexible connection. This pin is adapted to enter openings 14 in the draw-head to fasten a link thereto should it be necessary to include a car with an old-style link-and-pin coupling in the train. This link may be inserted in either of the spaces between fingers 4, according to the elevation of the opposite draw-head.

It will thus be seen that I have provided a cheap, durable, and efficient means of accomplishing the desired result, and while I have specifically described what to me appears to be the best means of accomplishing the desired result I would have it understood that I reserve the right to make such changes and alterations as would properly come within the scope of my invention without departing from the spirit of the claim.

I claim—

In a car-coupler, the combination with a draw-head formed with pin-openings; of a pivoted jaw arranged within the draw-head and comprising a bar on the forward end of which are a plurality of parallel headed fingers connected to said bar by a curved offset which is alined vertically with said pin-openings and is adapted for engagement with the heads on the fingers of the opposite coupling and also to serve as a seat for the pin; and an uncoupling-lever to operate said jaw.

In testimony whereof I affix my signature in presence of two witnesses.

THOMAS HICKLING.

Witnesses:
 B. F. FUNK,
 G. D. WITTER.